United States Patent [19]

Ribaldone et al.

[11] 4,036,859
[45] July 19, 1977

[54] METHOD FOR THE PREPARATION OF 2-HYDROXYBENZANTHRONE COMPOUNDS

[75] Inventors: Giuseppe Ribaldone, Gallarate (Varese); Giampiero Borsotti, Novara, both of Italy

[73] Assignee: Montedison Fibre S.p.A., Milan, Italy

[21] Appl. No.: 698,362

[22] Filed: June 22, 1976

[30] Foreign Application Priority Data

June 24, 1975  Italy ................... 24696/75

[51] Int. Cl.² .............. C09B 3/02; C09B 3/04; C09B 1/00
[52] U.S. Cl. ................. 260/364; 260/376; 260/383
[58] Field of Search ...................... 260/364

[56] References Cited

U.S. PATENT DOCUMENTS

| 1,791,309 | 2/1931 | Gubelmann et al. | 260/364 X |
|---|---|---|---|
| 2,295,649 | 9/1942 | Greune et al. | 260/364 |
| 2,595,348 | 5/1952 | Fleysher et al. | 260/364 |

OTHER PUBLICATIONS

Chem. Abs. vol. 44, 1079g "Polycyclic Compounds, Theory of Formation of Benzanthrone from Anthraquinone".
Chem. Abs. (1953) 8713h, "Anthraquinone and Anthrone Series".

*Primary Examiner*—Allen B. Curtis
*Attorney, Agent, or Firm*—Stevens, Davis, Miller & Mosher

[57] ABSTRACT

A process is disclosed for the preparation of 2-hydroxybenzanthrone and substituted derivatives thereof having the general formula:

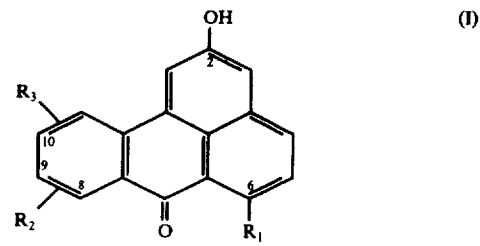

wherein:
$R_1$ = H, OH
$R_2$, $R_3$ = H, Cl, —OH, —OCH$_3$,

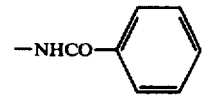

characterized in that an anthraquinone-1-diazonium salt is reacted with an olefinic compound of the formula:

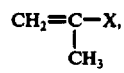

wherein X = CN or OCOCH$_3$, in an alcoholic medium of a lower monovalent alcohol and in the presence of a catalytic quantity of cuprous chloride, at a temperature between 20° and 100° C, and that the reaction intermediate thus obtained is reacted successively with alkali in alcoholic solution.

10 Claims, No Drawings

METHOD FOR THE PREPARATION OF 2-HYDROXYBENZANTHRONE COMPOUNDS

The present invention relates to a process for obtaining 2-hydroxybenzanthrone and the substitution derivatives thereof, covered by the general formula:

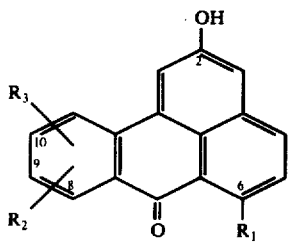

wherein:
$R_1$ = H, OH
$R_2$, $R_3$ = H, Cl, OH, OCH$_3$,

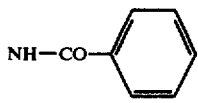

The compounds obtained according to this invention find a useful application as intermediates for dyes and pigments. 2-Hydroxybenzanthrone is an important intermediate long since known, and useful e.g. for the preparation of the vat dye C.I. 1101 (Caledon jade green X; Indanthrene brilliant green B; F.B.B.).

The derivatives of 2-hydroxybenzanthrone substituted in positions 6, 8, 9 and 10 with groups OH, OCH$_3$, Cl, NH—CO—C$_6$H$_5$, are by themselves new, and these new compounds are contemplated as within this invention. Certain other intermediates, which are anthraquinone derivatives, are also new, and as such within the scope of the present invention.

From these benzanthrone compounds in fact, there may be obtained dyes and pigments with excellent characteristics. For instance, 2,8-dihydroxybenzanthrone may be methylated selectively on the hydroxyl group in position 2, yielding 2-methoxy-8-hydroxybenzanthrone, a novel compound of a yellow color, which shows excellent qualities as a dispersed dye. Applied to the dyeing of polyester fibers, it gives shades of a brilliant yellow, with a high fastness to light and resistance to thermal treatments.

The syntheses of 2-hydroxybenzanthrone known for a long time are two: one, starting from benzanthrone; the other starting from 1-naphthalene-carboxylic acid. Both of these are complex syntheses which give low yields, due to the considerable number of stages.

In fact, the synthesis which starts from benzanthrone is based on the following reactions: nitration, reduction, and acetylation, so as to obtain 3-acetamidobenzanthrone from which, after nitration and hydrolyzation, there is obtained 2-nitro-3-amino-benzanthrone which, diazotized and reduced, gives 2-hydroxybenzanthrone.

No less complex is the synthesis that starts from 1-naphthalene-carboxylic acid and which is based on the following series of reactions: sulphonation, alkaline fusion, chlorination, Friedel-Crafts reaction, and Scholl reaction.

With the present invention, however, the 2-hydroxybenzanthrone becomes more easily accessible since it may be obtained with higher yields and at a a higher degree of purity than is possible with the syntheses know so far. Moreover, and as already indicated, with the present process there are easily obtained derivatives of 2-hydroxybenzanthrone substituted in positions 6, 8, 9 and 10 with groups OH, OCH$_3$, Cl, NH—CO—C$_6$H$_5$, and which are compounds new by themselves, which give rise to compounds with excellent dyeing properites.

Thus, one of the objects of this invention is that of providing a new process for the preparation of 2-hydroxybenzanthrone and of substituted 2-hydroxybenzanthrones, which process is free of the drawbacks of the prior art processes referred to.

This and other objects, which will become still more clearly apparent to those skilled in the art from the following description, are attained, according to this invention, by a process for the preparation of 2-hydroxybenzanthrone characterized in that anthraquinone-1-diazonium sulphates (II) are reacted with olefine compounds of the type

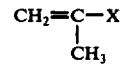

(with X = —CN, —OCOCH$_3$) in the presence of cuprous chloride in an alcoholic medium, and subsequently cyclizing with alcoholic KOH and NaOH the adducted anthraquinone intermediate (III) to the 2-hydroxybenzanthrone derivative (I).

The reaction scheme is the following:

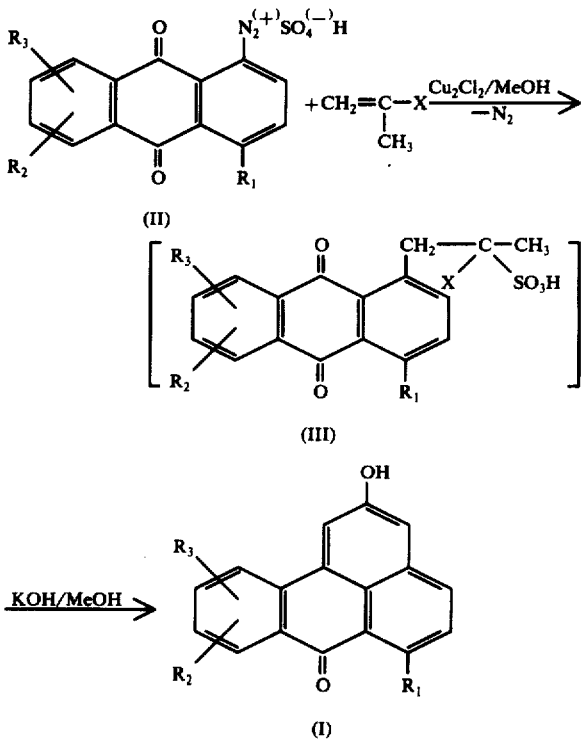

wherein: X, $R_1$, $R_2$, $R_3$ have the already indicated meanings.

The adducted anthraquinone (III) intermediate is not isolatable as such, but at the end of the reaction, after treatment with water, the ketonic compound (IV) or the corresponding cyanhydrine (V) is isolated, depending on which type of olefine compound has been used.

The compounds (IV) and (V), treated with alcoholic KOH or alcoholic NaOH, cyclize, leading to the same 2-hydroxy-benzanthrone derivative (I).

is preferred to use an excess corresponding to 5–10 mols per mol of anthraquinone-1-diazonium sulphate.

The cuprous chloride is used in catalytic quantities in the order of 1–5% by weight with respect to the anthraquinone-1-diazonium sulphate.

As solvents one may use lower monovalent alcohols having from 1 to 4 carbon atoms, preferably methanol.

More particularly, according to a practical form of

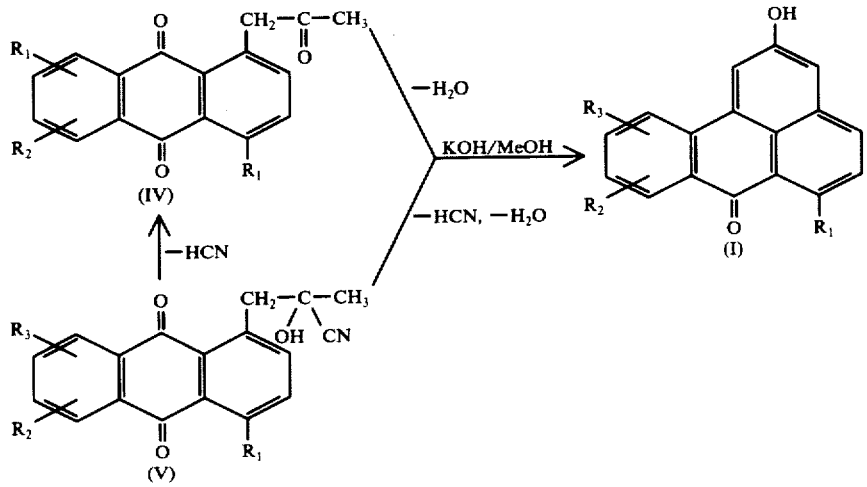

The cyanhydrine (V) shows a certain instability inasmuch as it tends to lose HCN to give compound (IV).

The present invention consists, thus, in first reacting the anthraquinone-1-diazonium sulphates (II) with methacrylonitrile or isopropenylacetate in the presence of a lower alcohol ($C_1$–$C_4$) and of a catalytic quantity of cuprous chloride, in then isolating the anthraquinone intermediate (IV) or (V), and in then transforming the latter to a 2-hydroxy-benzanthronic compound (I) by treatment with an alcoholic solution ($C_1$–$C_4$) of potassium or sodium hydroxide.

The reaction of the anthraquinone-1-diazonium sulphate (II) with the olefinic compound is carried out at a temperature between 20° and 100° C.

The subsequent stage of the cyclization of the anthraquinone intermediates (IV) or (V) is carried out at temperatures higher than 30° C, but preferably between 40° and 70° C.

According to this invention, the anthraquinone-1-diazonium sulphates are used in the solid state, in the form of a dry powder or a paste humid for $H_2O$. These may be obtained, according to per se known techniques, by diazotation of the corresponding 1-amino-anthraquinones in concentrated sulphuric acid, and by successive precipitation with water and ice.

The diazonium salt thus precipitated, after filtering and washing with water is then either dried under vacuum at low temperature, or is used directly while still humid.

For the purpose one may use anthraquinone-1-diazonium sulphates prepared e.g. from: 1-amino-anthraquinone; 4-hydroxy-1-aminoanthraquinone; 5-hydroxy-1-aminoanthraquinone; 5-methoxy-1-aminoanthraquinone; 5-chloro-1-amino-anthraquinone; 6,7-dichloro-1-aminoanthraquinone; 5-benzamide-1-aminoanthraquinone.

The olefinic compounds easily retrievable or synthetizable are methacrylonitrile or isopropylacetate. The quantity of methacrylonitrile or isopropenylacetate must be at least the stoichiometric quantity, although it embodiment, the process which is the object of this invention is carried out in the following way:

First, there is prepared a mixture of the diazonium salt, methacrylonitrile (or isopropenylacetate) and methanol. Thereupon the temperature is adjusted to between 25° and 40° C and then there is added a catalytic quantity of cuprous chloride: at once there occurs an exothermic reaction with the development of nitrogen.

At this time, the temperature is raised up to 50°–65° C, possibly adding some further small quantities of catalyst for completing the reaction. The reaction mixture, after cooling, is diluted with water and then subjected to distillation under vacuum, in order to recover the excess of olefinic compound; the distillation residue is then diluted in water, filtered and washed with water to neutrality.

Alternatively, the said reaction mixture is diluted with water and the precipitate thus formed, after filtering, is then washed with water to neutrality.

This product is then heated with methanolic KOH; the solution thus obtained, and which shows a red tinge, is filtered and freed of the insoluble impurities and is then acidified. Thereby one obtains a precipitate which is filtered, washed with water to neutrality, and finally dried.

The 2-hydroxybenzanthrones thus obtained are substances having a color that varies from yellow to orange, depending on the substituent present on the nucleus.

The process, thanks to the mild operational conditions, proves to be particularly convenient.

Still another advantage lies in the fact that it provides compounds especially useful for obtaining vat-dyes and pigments, a number of such compounds being themselves novel.

The following examples are given for purely illustrative and not limiting purposes, including some examples of the preparation of 2-hydroxy-benzanthrone derivatives, as well as an applicative example of the new compounds thus obtained.

EXAMPLE 1

To 150 cc of concentrated sulphuric acid were added under stirring 17 g of sodium nitrite over a period of 15 minutes. After a homogeneous solution had been obtained, there were added to it over a period of 1 hour 50 g of 1-aminoanthraquinone, maintaining the temperature at 30°-35° C. Thereupon, this mass was heated up to 50° C for about 20 minutes; the homogeneous solution was then cooled down to 30° C and poured slowly over 350 g of ice. The precipitated diazonium salt was then filtered, well squeezed out, washed with 30 cc of water and then again squeezed out. Thereby were obtained 120 g of humid anthraquinone-1-diazonium sulphate, which were added under stirring to a solution of 79 g of methacrylonitrile in 300 cc of methanol.

To the mixture thus obtained, heated up to 40° C, there were then added in small portions 1.2 g of cuprous chloride. After the first addition of 0.1-0.2 g there develops an exothermic reaction with the formation of nitrogen. Every time the development of nitrogen showed a tendency to cease, there was added, in small portions, the remaining cuprous chloride so that each time the development of nitrogen tended to drop, this was restarted.

The reaction is completed when, after a further addition of cuprous chloride, it is observed that there is no further formation of nitrogen bubbles. At this point the temperature had risen to 60° C. The mixture was stirred for another 15 minutes and was then left to cool down to room temperature. Thereby there was obtained a semi-solid mass which was diluted with 100 cc of water, after which it was subjected to distillation under a vacuum of 200 mm Hg.

There was obtained a distillate containing 35.7 g of methacrylonitrile, besides methanol and water. The distillation residue was then mushed or slurried with water, filtered, washed with water to neutrality, and finally well squeezed. The solid product thus obtained, consisting of 3-(1-anthraquinonyl)-2-hydroxy-2-methyl-propionitrile:

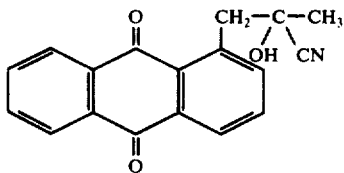

is suspended, still humid, in a solution of 500 cc of methanol containing 25 g of potassium hydroxide. This suspension was then reflux-heated for 1.5 hours and the red tinged solution thus obtained was freed of the insoluble impurities by filtering. It was then diluted with water up to 1.5 liters and then acidified with concentrated hydrochloric acid. Thereby was formed a yellow tinged precipitate which was filtered, washed with water to neutrality, and finally dired at 100° C under vacuum until attaining a constant weight. In this way there were obtained 44.8 g of 2-hydroxybenzanthrone in the form of a yellow powder.

A sample of this product, crystallized from nitrobenzene, melted at 297°-298° C with decomposition.

Elementary analysis: Found %age of : C = 82.90; H = 4.40. Theoretical %age for $C_{17}H_{10}O_2$: C = 82.92; H = 4.10.

Mass spectrum: $M^+$ at m/e 246; other peaks at 218, 189, 187.

EXAMPLE 2

A mixture of 14 g of anthraquinone-1-diazonium sulphate, 25 cc of methacrylonitrile, and 75 cc of methanol, was heated to 40° C under stirring. Thereupon there was added 0.1 g of cuprous chloride. At once an exothermic reaction occurrred with the development of nitrogen; the temperature rose up to 56° C.

Whenever the development of nitrogen tended to drop, there was added 0.1 g of cuprous chloride and stirring was carried on for about 20 minutes until reaching 60°-65° C.

Once the reaction had ended, the mixture was cooled down to room temperature and then diluted with 200 cc of water; an oily product formed which, after 1 hour, completely solidified. This solid was filtered and washed with water to neutrality. Still in the humid state, the solid was suspended in a solution of 150 cc of methanol containing 7.5 g of potassium hydroxide, and then was refluxed for 1 hour. Thereby was obtained a solution of a red color, which was freed of the insoluble impurities by filtering; it was then diluted with water and acidified with concentrated hydrochloric acid.

Thereby was formed a yellow-tinged precipitate which was filtered, washed with water to neutrality, and then dried under vacuum at 100° C until attaining a constant weight. Thereby was obtained 8.4 g of 2-hydroxybenzanthrone as a yellow powder.

A sample of the product, crystallized from nitrobenzene, melted at between 297° and 298° C.

The 2-hydroxybenzanthrone thus obtained displayed chemical-physical characteristics identical with those of the product obtained in Example 1.

EXAMPLE 3

A mixture of 14 g of anthraquinone-1-diazonium, sulphate, 27.2 cc of isopropenylacetate, and 75 cc of methanol was maintained at 25° C under stirring.

To this mixture were than added 0.2 g of cuprous chloride; at once an exothermic reaction occurred with the development of nitrogen and a rise of the temperature up to 53° C. The reaction lasted for about 10 minutes; the reaction mixture was then reflux-heated for 15 minutes and then cooled down to room temperature and diluted with 200 cc of water.

The precipitated solid was then filtered and washed to neutrality with water.

0.2 g of the solid thus obtained were dried and analyzed by chromatography on silica gel. In this way there was obtained 1-acetonylanthraquinone in the pure state:

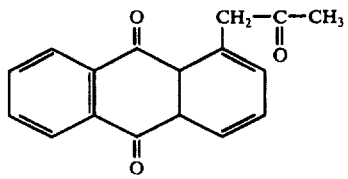

The substance had the appearance of a white yellowish powder with a melting point between 198.5° and 199.5° C.

Elementary analysis: Found %age : C = 77.14; H = 4.73. Theoretical %age for $C_{17}H_{12}O_3$ : C = 77.25; H = 4.57.

Mass spectrum : M $^+$ at m/e 264; other peaks at 247, 222 and 165.

The residual 1-acetonylanthraquinone, still in the humid state, was suspended in a solution of 150 cc of methanol containing 7.5 g of potassium hydroxide and then reflux-heated for 1 hour. A red-tinged solution was obtained which was then freed of the insoluble impurities by filtering, then diluted with water, and finally acidified with concentrated hydrochloric acid. A precipitate of a yellow tinge was thus formed, which was filtered, washed with water to neutrality, and then dried under vacuum at 100° C until reaching a constant wieght. There were thus obtained 6.3 g of 2-hydroxy-benzanthrone.

The 2-hydroxybenzanthrone thus obtained showed chemical-physical characteristics identical with those of the product prepared according to Example 1.

EXAMPLE 4

A mixture of 14.6 g of 5-hydroxy-anthraquinone-1-diazonium sulphate, 25 cc of methacrylonitrile, and 75 cc of methanol, was heated up to 40° C under stirring. There were thn added 0.1 g of cuprous chloride: at once an exothermic reaction took place with the development of nitrogen and a rise in temperature to 55° C.

When the development of nitrogen tended to drop, there was added a further 0.1 g of cuprous chloride while sitrring was carried on at 60°-65° C for about 20 minutes. Once the reaction had been completed, the mixture was treated in the same way as indicated above in Example 2. There were thus obtained 10.1 g of 2,8-dihydroxybenzanthrone as a yellow brown powder.

A sample of the product crystallized from dichlorobenzene was subjected to analytical controls. Through heating there set in a slow decomposition at a temperature above 250° C.

Elementary analysis: Found %age : C = 77.71; H = 3.87. Theoretical %age for $C_{17}H_{10}O_3$ : C = 77.85; H = 3.84.

Mass specturm: M $^+$ at m/e 262; other peaks at 234, 205 and 176.

EXAMPLE 5 (Applicative Example)

To a mixture of 3 g of 2,8-dihydroxybenzanthrone as obtained as above in Example 4, 30 cc of dimethylformamide, and 2.1 g of potassium carbonate, kept under stirring and heated to 80° C, 1.9 cc of dimethylsulphate were added over a period of 30 minutes. At the end of the addition of the dimethylsulphate there was obtained a yellow crystalline product which was filtered, then washed with dimethylformamide, then with water, and finally with methanol.

After drying, there were obtained 1.5 g of 2-methoxy-8-hydroxy-benzanthrone in the form of a yellow powder with a melting point of 207°-208° C.

Elementary analysis:
Found %age : C = 78.63; H = 4.56.
Theoretical %age for $C_{18}H_{12}O_3$ : C = 78.24; H = 4.38.

Mass spectrum: M $^+$ at m/e 276; other peaks at 247, 233 and 205.

In a pressurized dyeing apparatus 100 g of a previously scoured polyester fabric were treated for 10–15 minutes, with 2 liters of a dyeing bath at 50° C containing 2 g/l. of ammonium sulphate and 1 g/l. of Emulsion ELU (a non-ionic surfactant — Montedison trade mark). There was then added 1 g of the dye obtained as described immediately above and previously dispersed and filtered through a sieve. The dyeing bath was then brought to a pH of 5.5 with formic acid and then heated to 90° C over a period of 20–30 minutes. The temperature was then slowly raised to 130° C, at which temperature it was maintained for 60 minutes.

At the end of the dyeing, the bath was cooled down to 80°-85° C, it was then discharged, the fabric was rinsed and subjected to an alkaline treatment, reducing for 20 minutes at 80° C with a bath containing:

2 cc/l of caustic soda 36° Be
2 g/l of Albite A ($Na_2S_2O_4$ and 85%)
0.5 g/l of Diapal CW (non-ionic detersive — Montedison trade mark).

Thereupon the fabric was thoroughly rinsed and dried. There was obtained a dyeing of a bright yellow tone, characterized by a high fastness to light, moisture resistance, and resistance to thermal treatment.

EXAMPLE 6

A mixture of 14.6 g of 4-hydroxy-anthraquinone-1-diazonium sulphate, 25 cc of methacrylonitrile, and 75 cc of methanol, was heated up to 40° C under stirring. Thereupon were added 0.2 g of cuprous chloride. At once an exothermic reaction occurred with the development of nitrogen. The mixture was cooled so as to maintain the reaction temperature of the reacting mixture at 45° C. Once the development of nitrogen had been completed, the brown solution thus obtained was first heated for 20 minutes at 60°-65° C, then it was cooled down and diluted with 100 cc of water. At this point an oily product precipitated which, left to rest over night, solidified. After filtering and washing with water to neutrality, the solid product was treated following the same procedures as those described above in Example 2.

Thereby obtained 9.6 g of 2,6-dihyroxybenzanthrone in the form of a yellow-brown colored powder.

A sample of the product crystallized from dichlorobenzene, melted at 280° C. The substance when dissolved in organic solvents, showed a fluorescent yellow-green coloring.

Elementary analysis: Found %age : C = 77.79; H = 3.92. Theoretical %age for $C_{17}H_{10}O_3$ : C = 77.85; H = 3.84.

Mass spectrum: M $^+$ at m/e 262; other peaks at 234, 205 and 176.

EXAMPLE 7

A mixture of 15.2 g of 5-methoxy-anthraquinone-1-diazonium sulphate, 25 cc methacrylonitrile, and 75 cc of methanol, was heated to 40° C under stirring, and 0.1 g of cuprous chloride was then added. At once an exothermic reaction took place with the development of nitrogen and a rise in temperature up to 53° C.

When the development of nitrogen tended to drop, a further 0.2 g of cuprous chloride in small portions were added. After the development of nitrogen practically ceased, the reaction mixture was heated for 15 minutes at 65° C. During this time there was formed a precipitate of a yellow color. This precipitate was then cooled down to room temperature and then diluted with 200 cc of water; this was then kept under stirring for 2 hours. Finally the yellow precipitate was filtered and then washed with water to neutrality.

It was then processed according to the procedures described above in Example 2. In this way were obtained 10.2 g of 8-methoxy-2-hydroxybenzanthrone as a yellow brown powder. A sample of this product, crystallized from dimethyformamide melts at 298°–300° C accompanied by decomposition.

Elementary analysis: Found %age : C = 78.22; H = 4.31. Theoretical %age for $C_{18}H_{12}O_3$: C = 78.24; H = 4.38.

Mass spectrum: $M^+$ m/e 276; other peaks at: 259, 247, 189.

EXAMPLE 8

A mixture of 15.4 g of 5-chloro-anthraquinone-1-diazonium sulphate, 25 cc methacrylonitrile, and 75 cc of methanol, was heated up to 40° C under stirring, and was then additioned with 0.1 g of cuprous chloride. At once an exothermic reaction occurred with the development of nitrogen and with a rise in temperature up to 56° C.

When the development of nitrogen tended to drop there was added a further 0.2 g of cuprous chloride in small portions. During this time a precipitate was formed. After the development of nitrogen had practically stopped, the reaction mixture was heated up to 65° C for 20 minutes, then cooled down to room temperature and poured into 300 cc of water. An oily substance was thereby formed which, after 4 hours of stirring, became completely solidified. The resulting solid was then filtered and washed with water to neutrality. Thereupon it was treated as described above in Example 2. There was thus obtained 8.1 g of 8-chloro-2-hydroxybenzanthrone in the form of a yellow brown powder. A sample of the product, crystallized from nitrobenzene, melted at between 308° and 312° C, accompanied by decomposition.

Elementary analysis: Found %age : C = 72.69; H = 3.18; Cl = 12.31. Theoretical %age $C_{17}H_9ClO_2$: C = 72.74; H = 3.23; Cl = 12.62.

Mass spectrum: $M^+$ at m/e 280; other peaks at: 252, 189, 187.

EXAMPLE 9

A mixture of 16.45 g of 6,7-dichloro-anthraquinone-1-diazonium sulphate, 25 cc methacrylonitrile, and 75 cc of methanol, was heated under stirring to 40° C, after which it was additioned with 0.1 g of cuprous chloride. At once an exothermic reaction occurred with the development of nitrogen and a rise of the temperature up to 60° C. Whenever the development of nitrogen tended to drop, there were added in small portions a further 0.4 g of cuprous chloride; the mixture was then reflux-heated for 15 minutes and then cooled down to room temperature. It was then diluted with 200 cc of water and then subjected to stirring for 3 hours.

The solid that thereupon formed was filtered and washed with water to neutrality. Thereafter it was processed according to the procedures described above in Example 2.

Thereby were obtained 4.5 g of 9,10-dichloro-2-hydroxybenzanthrone as a yellow powder.

A sample of the product, crystallized from nitrobenzene, melted at between 355° and 360° C, accompanied by decomposition.

Elementary analysis: Found %age : C = 64.87; H = 2.77; Cl = 21.95. Theoretical %age for $C_{17}H_8Cl_2O_2$: C = 64.79; H = 2.56; Cl = 22.49. Mass spectrum: $M^+$ at m/e 314; other peaks at: 286, 228, 216, 187.

EXAMPLE 10

To 60 cc of concentrated sulphuric acid were added, under stirring, 3.1 g of sodium nitrite over a period of 15 minutes. After a homogeneous solution was obtained, over a period of 1 hour there were added 14.3 g of 5-benzamido-aminoanthraquinone, while maintaining the temperature at 25° C. The stirring was continued for another hour, after which the homogeneous solution was slowly poured onto ice. The resulting precipitate was then filtered, squeezed, washed with water and acetone, and finally dried under vacuum at 25° C.

The diazonium salt thus obtained was added, under stirring, to a solution of 50 cc of methacrylonitrile in 150 cc of methanol. This solution was then heated up to 35°–40° C, and then additioned with 0.4 g of cuprous chloride, in small portions.

After the first addition an exothermic reaction began, with development of nitrogen. The successive additions of cuprous chloride were effected each time the development of nitrogen tended to stop.

After the development of nitrogen stopped and did not start again after a further addition of cuprous chloride, the reaction mixture was kept at 65° C for 20 minutes, whereupon it was cooled down to room temperature and diluted with 200 cc of water.

The precipitated solid was filtered, washed with water, and then reflux-heated for 1 hour with a solution of 200 cc of methanol containing 10 g of potassium hydroxide. Thereby was formed a red-brown precipitate that was only slightly soluble in methanol. After acidifying with HCl, an orange-tinged solid was obtained which was filtered, washed with methanol and water, and finally dried.

Thereby were obtained 12.1 g of 8-benzamido-2-hydroxybenzanthrone as an orange-tinged powder.

A sample of the product, crystallized twice from nitrobenzene, melted between 308° and 310° C, accompanied by decomposition.

Elementary analysis: Found %age: C = 78.68; H = 4.05; N = 3.95. Theoretical %age for $C_{24}H_{15}NO_3$: C = 78.89; H = 4.14; N = 3.83.

Mass spectrum: $M^+$ at m/e 365; other peaks at 105 and 77.

What is claimed is:

1. A process for the preparation of a compound having the general formula:

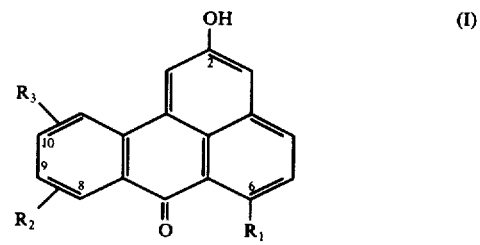

wherein:

$R_1$ is selected from the class consisting of H and OH; and $R_2$ and $R_3$ are selected from the class consisting of H, Cl, OH, $OCH_3$ and

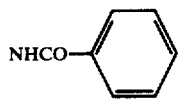

characterized in that an anthraquinone-1-diazonium salt is reacted with an olefinic compound of the formula:

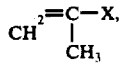

wherein X = CN or OCOCH₃, in an alcoholic medium of a lower monovalent alcohol and in the presence of a catalytic quantity of cuprous chloride, at a temperature between 20° and 100° C, and that the reaction intermediate thus obtained is reacted successively with alkali in alcoholic solution to produce said compound.

2. A process according to claim 1, wherein the temperature is between 40° and 70° C.

3. A process according to claim 1, characterized in that as the diazonium salt there is used an anthraquinone-1-diazonium sulphate prepared from: 1-aminoanthraquinone, 4-hydroxy-1-amino-anthraquinone, 5-hydroxy-1-aminoanthraquinone, 5-methoxy-1-aminoanthraquinone, 5-chloro-1-aminoanthraquinone, 6,7-dichloro-1-aminoanthraquinone, or 5-benzamido-1-aminoanthraquinone.

4. A process according to claim 1, characterized in that the olefinic compound is used in excess with respect to the anthraquinone-1-diazonium salt.

5. A process according to claim 4, wherein said excess corresponds to a molar ratio between 5:1 and 10:1.

6. A process according to claim 1, characterized in that the reaction medium is a monovalent aliphatic alcohol having from 1 to 4 carbon atoms.

7. A process according to claim 6, wherein the alcohol is methanol.

8. A process according to claim 1, characterized in that the alkali is selected from the class consisting of KOH and NaOH.

9. A process according to claim 8, wherein the alkali is KOH in a methanolic solution.

10. A process according to claim 1, characterized in that the cuprous chloride is used in quantities between 1% and 5% by weight with respect to the diazonium salt.

* * * * *